Figure 1:
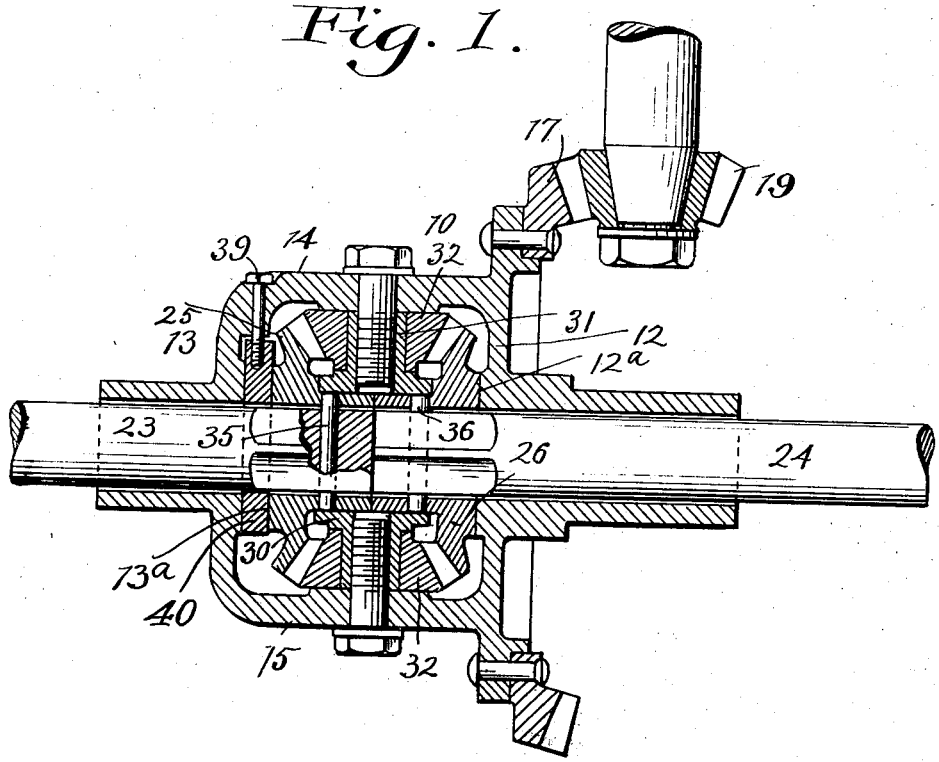

A. P. BRUSH.
DIFFERENTIAL GEARING.
APPLICATION FILED MAY 15, 1915.

1,185,174.

Patented May 30, 1916.
2 SHEETS—SHEET 1.

Witnesses
E. B. Filchrist
A. J. Hudson

Inventor
Alanson P. Brush
by Thurston & Kiwis
Attorneys

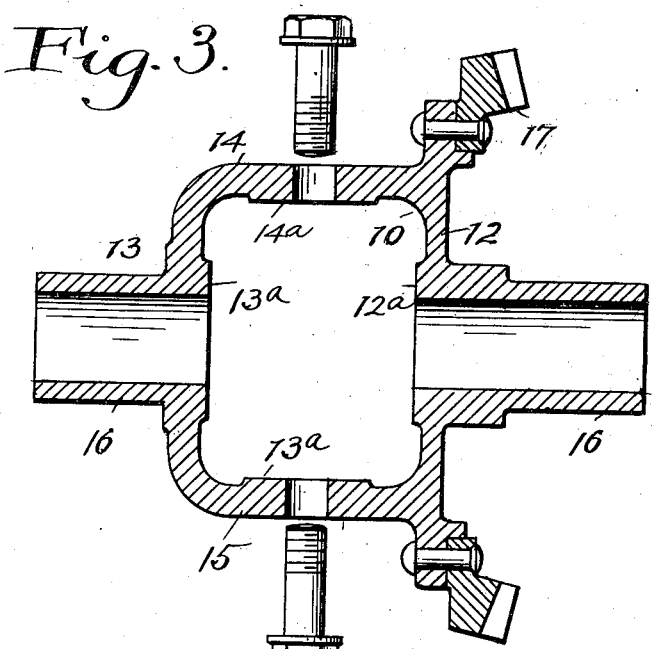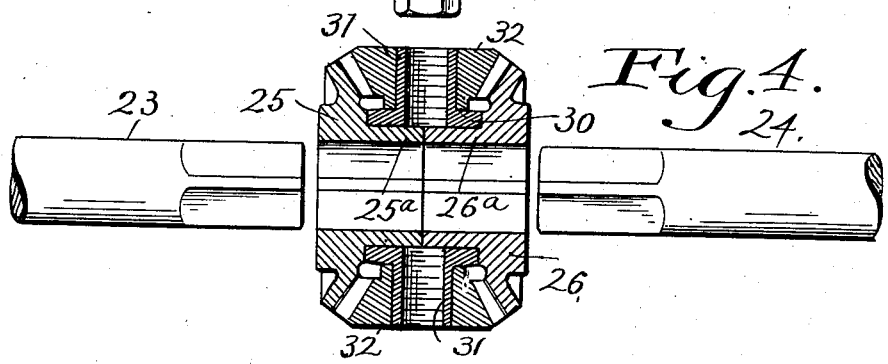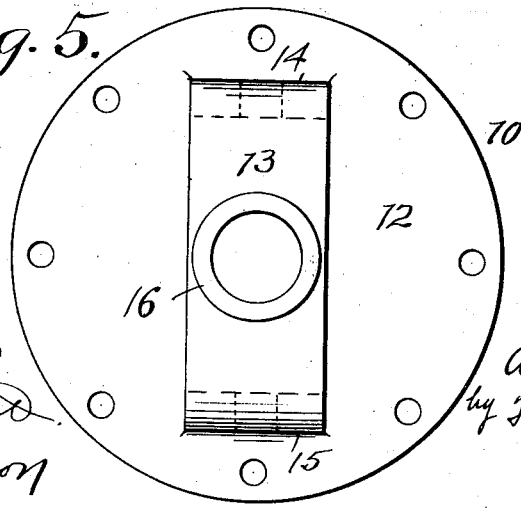

UNITED STATES PATENT OFFICE.

ALANSON P. BRUSH, OF DETROIT, MICHIGAN.

DIFFERENTIAL GEARING.

1,185,174. Specification of Letters Patent. Patented May 30, 1916.

Application filed May 15, 1915. Serial No. 28,454.

*To all whom it may concern:*

Be it known that I, ALANSON P. BRUSH, a citizen of the United States, residing at Detroit, in the county of Wayne and State of Michigan, have invented a certain new and useful Improvement in Differential Gearing, of which the following is a full, clear, and exact description.

The object of this invention is to provide a cheaply constructed and easily assembled differential gearing which is especially adapted for use as a part of the rear axle mechanism of an automobile.

The invention consists in the construction and combination of parts shown in the drawings and hereinafter described and definitely pointed out in the appended claims.

Figure 2:
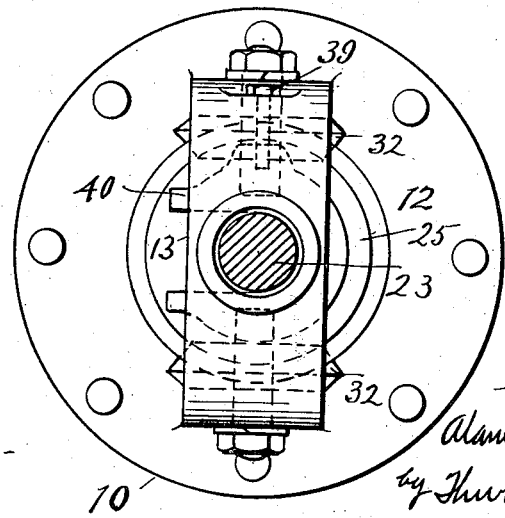

In the drawings, Figure 1 is a longitudinal central section of said differential gearing and some adjacent parts of the rear axle of an automobile. Fig. 2 is a sectional end view. Fig. 3 is a sectional side elevation of the driving member. Fig. 4 is a sectional view of the gearing unit and the axle sections withdrawn therefrom. Fig. 5 is an end view of the driving member.

Referring to the parts by reference characters, 10 represents the rotatable driving member of the differential gearing. This is in the form of a one-piece open rectangular cage having two parallel end members 12 and 13, two parallel side members 14 and 15, and two alined tubular hubs 16 by means of which it may be rotatably mounted in any well known manner. Preferably a beveled gear 17, which must be concentric with said hubs, is fixed to this driving member, in order that the latter may be turned, as, for example, by a beveled gear 19 which engages with the beveled gear 17. The end member 12 is preferably in the form of a circular plate; but the end member 13 is like a bar or strap; and these two end members are parallel in the sense that their inner surfaces 12ª and 13ª around the holes in said hub are nicely finished and are parallel. The two side members 14 and 15 are straplike pieces which are parallel in the sense that certain parts 14ª and 15ª at their inner surfaces are nicely finished and are parallel, and are at right angles to the surfaces 12ª, 13ª. The gears and spider which this cage is designed to support are so constructed that they can be assembled as a unit outside of the cage, and inserted as a unit into the cage, and then be so connected thereto that their withdrawal is impossible. The cage and this unit are, however, so constructed that when the gear unit is secured in the cage the gears must needs maintain their operative relation with each other. This gear unit comprises a spider, two driven gears 25, 26, and two compensating gears 32. The spider comprises a tubular hub 30 and two diametrically opposed cylindrical studs 31. The driven gears 25, 26, are formed respectively with the tubular hubs 25ª, 26ª, which hubs are inserted into opposite ends of the spider hub and are rotatable therein. The ends of said spider hubs engage annular shoulders 25ᵇ, 26ᵇ, on the said gears and thereby endwise movement of said gears toward one another is prevented.

The compensating gears 32 are mounted on the spider studs 31, and their inner faces engage annular shoulders 31ª on the spider studs. When the four gears have been mounted on the spider as described, said gears are properly in mesh. At this time also the outer faces of the compensating gears 32 are substantially flush with the outer ends of the studs 31; and the distance between the outer ends of said studs is substantially equal to the distance between the opposed inner surfaces 14ª and 15ª of the side members of the cage. So, also, the distance between the outer faces of the gears 25, 26, is substantially equal to the distance between the finished inner surfaces 12ª 13ª.

23 and 24 represent the two live axle sections. These pass from opposite directions through the hubs 16 and into the hubs of the driven gears 25, 26, with which they have a driving connection. Preferably the projecting inner ends of these axle sections are square, and the holes in the hubs are squared to fit them. In automobile rear axles as heretofore constructed, these axle sections have been supported in various ways so as to permit their rotation independently of each other and of the driving member of the differential mechanism. Sometimes means are provided independently of the differential mechanism for preventing the endwise outward movement of these axle sections. Sometimes this movement is prevented by connecting the inner ends of said axle sections with the driven gears. This invention is adapted for use with axle sections regardless of the manner in which they are supported. But a supplemental feature of the invention shown in Fig. 1, is especially contrived to facilitate the connection of said axle sections with the driven gears 25, 26, when this is desirable. If the driven gears are not to be utilized to prevent the endwise outward movement of the axle sections, then the inner finished surface 13ª is formed directly on the end member 13 of the cage, as shown in Fig. 1. When this construction is adopted, and when the gear unit has been assembled outside of the cage as stated, it is slipped into the cage, and there secured by screws which pass through the side members of the cage and screw into the ends of the spider studs. Of course, this is done while the axle sections are sufficiently withdrawn outwardly to permit it. After the gear unit has been secured in the cage as stated, these axle sections are pushed in place until their squared ends enter the squared holes in the driven gear. The outer faces of the driven gears 25, 26, will bear against the inner finished surfaces 12ª, 13ª, and the outer faces of the compensating gears will bear against the inner finished surfaces 14ª, 15ª, of the side members of the cage, thereby the proper meshing of the driven gears and compensating gears will be maintained.

If it is desired to have the axle sections connected with the driven gears 25, 26, in such wise that the axle sections can not be moved endwise outward, the cage is constructed so that the distance between the inner surfaces of its end members is slightly greater than as before explained, as shown in Fig. 1. In that event, the gear unit will be assembled outside of the cage as before, and will be put into the cage in position such that the outer face of the driven gear 26 will engage the inner finished surface 12ª of the end member 12. Holes are previously drilled through the hubs of the driven gears, and through the axle sections as shown. And the pins 35, 36, go respectively through the holes in said hubs and axle sections substantially as shown, and are held in place by the overlying part of the spider hub in which the hubs of the driven gears are rotatably mounted. In order to insert these pins, the spider and the gear 25 are slipped to the left within the cage. This will uncover the holes in the hub of the gear 26. The pin 35 may now be passed through these holes and through the hole in the associated axle section. Then the spider is pushed to the right and its hub will slip over the holes through which this pin has been passed. This movement to the right of the spider independently of the gear 25 will uncover the holes in the hub 25ª, and thereupon the pin 36 will be slipped through the holes in this hub and through the hole in the axle section 23. Then said axle section and gear 25 will be pushed to the right into the position shown, wherein the hub of the spider will cover the holes in the hub 25 through which said pin was inserted. The various parts of the gear unit are now in proper position relatively to each other. In order to hold them in this position a U-shaped washer 40 is employed. This is slipped into the cage around the axle section and between the end member 13 and the outer face of the driven gear 25, and it is of such thickness that it will substantially fill the space between these two surfaces and thereby prevent any leftward movement of the driven gear 25 such as will disturb its mesh with the compensating gears. In this construction it is the inner finished surface 13ª on the inner face of the washer. This washer after being so inserted as stated, may be secured to the cage in any suitable manner, as by a screw 39, and becomes in effect a part of the cage.

Having described my invention, I claim:

1. In differential gearing, the combination of a rotatable driving member having an open cage-like body, and two alined tubular hubs by means of which it may be rotatably supported, and a differential gear unit comprising a spider, two driven gears rotatably supported thereby, and two compensating gears also supported thereon in mesh with the driven gears,—said gear unit being removably secured in said cage by means which connect the spider and cage.

2. In differential gearing, the combination of a rotatable driving member having an open cage which has four interior finished surfaces arranged in the form of a rectangle, and a differential gear unit which is removably secured in said open cage; which gear unit comprises two driven gears, which respectively engage two of said finished surfaces, two compensating gears, which respectively engage the other two finished surfaces, and a spider by which said gears are supported for relative rotation.

3. In differential gearing, the combination of a gear unit comprising a spider having a tubular hub and two diametrically opposed cylindrical studs, two driven gears having tubular hubs which are rotatably mounted in the spider hub, and two compensating gears which are rotatably mounted on said studs,—said gears and spider having engaging shoulders by which the gears are positioned relatively to each other, and a rotatable cage into which such assembled gear unit may be inserted,—which cage has axially disposed holes which are alined with the holes in the tubular hubs of the driven gear and which has also four interior finished surfaces arranged in the form of a rectangle and which serve as thrust bearings for the driven gears and compensating gears, and means connecting said spider and said cage.

4. In differential gearing, the combination of a gear unit comprising a spider having a tubular hub and two diametrically opposed cylindrical studs, two driven gears having tubular hubs which are rotatably mounted in the spider hub, and two compensating gears which are rotatably mounted on said studs,—said gears and spider having engaging shoulders by which the gears are positioned relatively to each other, and a rotatable cage into which such assembled gear unit may be inserted which cage has axially disposed holes which are alined with the holes in the tubular hubs of the driven gear and which has also four interior finished surfaces arranged in the form of a rectangle and which serve as thrust bearings for the driven gears and compensating gears, and screws passing through the side members of said cage and screwing into the ends of the spider studs.

5. In differential gearing, the combination of a gear unit comprising a spider having a tubular hub and two diametrically opposed cylindrical studs, two driven gears having tubular hubs which are rotatably mounted in the spider hub, and two compensating gears which are rotatably mounted in said studs,—said gears and spider having engaging shoulders by which the gears are positioned relatively to each other, a driving member having axially alined tubular hubs whereby it may be rotatably mounted, and a cage-like body in which said assembled gear unit may be inserted,—which cage-like body has four interior finished surfaces arranged in the form of a rectangle which serve as thrust bearings for the driven gears and compensating gears, two alined axle sections which pass through and are rotatable in the hubs of the driving member and which also pass into the tubular hubs of the driven gears, pins which pass respectively through those parts of the hubs of the driven gears which are normally within the spider hub and through said axle sections, and a U-shaped washer which is rigidly connected to one of the end members thereof and therefore is in effect a part of said end member,—one of the interior finished surfaces referred to being formed on the inner face of said U-shaped washer.

In testimony whereof, I hereunto affix my signature in the presence of two witnesses.

ALANSON P. BRUSH.

Witnesses:
E. L. THURSTON,
A. J. HUDSON.